United States Patent
de Montmollin et al.

[11] 3,895,004
[45] July 15, 1975

[54] DISAZO DYESTUFFS CONTAINING A HETEROCYCLIC BRIDGING MEMBER

[75] Inventors: René de Montmollin, Riehen; Gerd Hoelzle, Liestal; Hans-Joerg Angliker; Richard Peter, both of Basel, all of Switzerland

[73] Assignee: Ciba-Geigy AG, Basel, Switzerland

[22] Filed: Aug. 23, 1973

[21] Appl. No.: 391,175

Related U.S. Application Data

[63] Continuation of Ser. No. 109,664, Jan. 25, 1971, abandoned, which is a continuation-in-part of Ser. No. 753,901, Aug. 20, 1968, Pat. No. 3,642,764.

[30] Foreign Application Priority Data

Aug. 25, 1967 Switzerland.................. 11938/67
July 17, 1968 Switzerland.................. 10745/68

[52] U.S. Cl. ............... 260/153; 260/152; 260/154; 260/155; 260/156; 260/157; 260/158; 260/249.8; 260/295 R; 260/295.5 R; 260/326.46; 260/332.2 C; 260/347.3; 260/347.5

[51] Int. Cl. ........................................... C09b 33/16

[58] Field of Search ........... 260/152, 153, 156, 157, 260/154

[56] References Cited
UNITED STATES PATENTS

| | | | |
|---|---|---|---|
| 3,271,383 | 9/1966 | Yamaya et al. ..................... | 260/156 |
| 3,401,158 | 9/1968 | Fisher et al. ....................... | 260/158 |
| 3,415,809 | 12/1968 | Fisher et al. ....................... | 260/158 |
| 3,642,764 | 2/1972 | de Montmollin et al. ........... | 260/152 |
| 3,691,148 | 9/1972 | Peter et al. ......................... | 260/152 |
| 3,712,881 | 1/1973 | Angliker et al. .................... | 260/157 |
| 3,749,576 | 7/1973 | Piller.................................. | 260/156 |
| 3,770,718 | 11/1973 | Angliker et al. .................... | 260/156 |
| 3,804,630 | 4/1974 | Loefed et al........................ | 260/153 |

*Primary Examiner*—Henry R. Jiles
*Assistant Examiner*—Robert W. Ramsuer
*Attorney, Agent, or Firm*—Joseph G. Kolodny; Edward McC. Roberts; Michael W. Glynn

[57] ABSTRACT

Disazo dyestuffs of the formula

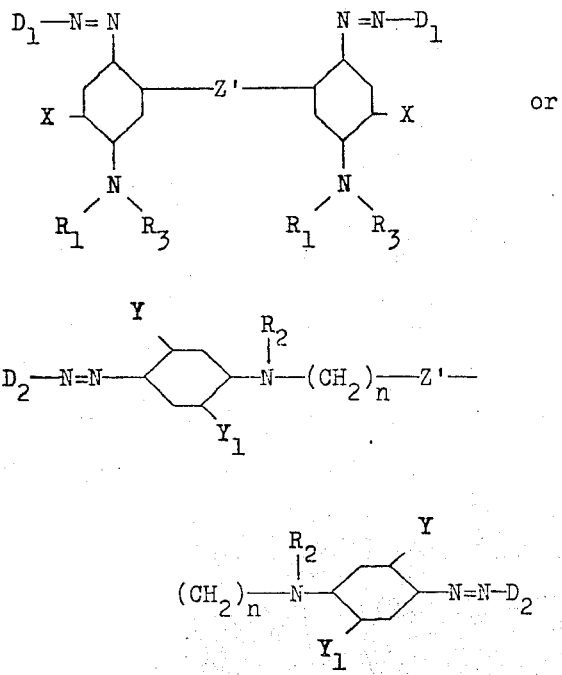

or

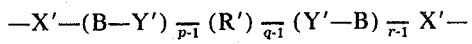

in which $D_1$ and $D_2$ each represents the residue of a diazo component of the benzene or naphthalene series containing at least one and not more than three sulpho groups; X, Y and $Y_1$ each represents hydrogen, trifluoromethyl, lower alkanesulphonyl, lower alkyl, lower alkoxy, phenoxy, chlorine, bromine or lower carboxylic acylamino; $R_1$, $R_2$ and $R_3$ each represents hydrogen, lower alkyl or lower alkyl substituted by cyano, hydroxyl, lower acyloxy or esterified carboxyl; $n = 1$, 2 or 3 and Z' represents the bridge member of the formula $$-X'-(B-Y')_{\overline{p-1}}(R')_{\overline{q-1}}(Y'-B)_{\overline{r-1}}X'-$$

where B represents —CO—, —SO$_2$— or lower alkylene; X' and Y' each represents —O—, —NR$_4$— (wherein $R_4$ is hydrogen or lower alkyl), or a direct linkage; R' represents a diazine, triazine, furan, pyridine, pyrrole or thiophene residue; $p$, $q$ and $r = 1$ or 2, the sum of $p+q+r$ must be at least 4. The dyestuffs are suitable for dyeing and printing materials of minimal origin, polyamide fibres, polyurethanes and other such materials. The obtained dyeings and prints exhibit excellent light and wet fastness.

7 Claims, No Drawings

DISAZO DYESTUFFS CONTAINING A HETEROCYCLIC BRIDGING MEMBER

This application is a continuation of application Ser. No. 109,664 filed Jan. 25, 1971, now abandoned, which in turn is a continuation-in-part of application Ser. No. 753,901, filed Aug. 20, 1968, now U.S. Pat. No. 3,642,764.

The present invention provides new, valuable disazo or polyazo dyestuffs in which two azo dyestuff molecules, which may contain fibre-reactive groups, of the general type (I) 

gen atom or preferably a low-molecular (containing 1 to 4 carbon atoms) substituted or unsubstituted alkyl group, which may be linked with the residue $A_1$ or $A_2$ in the ortho-position to the group $-NR_1R_3$ or $-NR_2R_4$ to form a ring; $R_4$ represents a low-molecular substituted or unsubstituted alkylene group; $A_1$ and $A_2$ each represents a benzene or naphthalene residue in which the azo group and the group $-NR_1R_3$ or $-NR_2R_4$ are attached in the 1,4-position to each other; $D_1$ and $D_2$ each represents the residue of an aromatic or heterocyclic diazo component containing a sulpho group and if desired a fibrereactive group, and Z represents a divalent bridge having no dyestuff characteristics.

Specially valuable are dyestuffs of the present invention of formulae (IV) 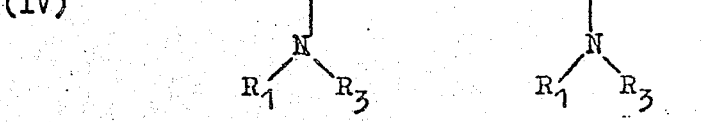

(V) 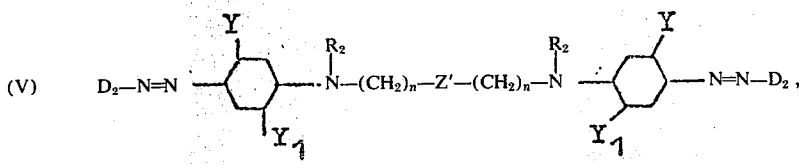

(where D represents the residue of a diazo component containing at least one strongly acidic group imparting solubility in water and if desired azo groups, A represents the residue of a coupling component of the benzene or naphthalene series containing the amino group in the paraposition to the azo group, $R_o$ and R each represents a hydrogen atom or an alkyl or aralkyl residue which may be substituted) are linked through their coupling components by a divalent bridge Z (having no dyestuff characteristics), which is bound either through the residues $R_o$ and/or R or directly to the residues of the coupling components.

More particularly the present invention provides new disazo or polyazo dyestuffs, in which two of the same or different azo dyestuff residues of the general formula (II) 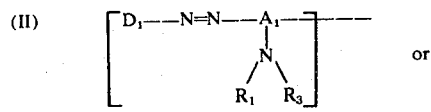 or (III) 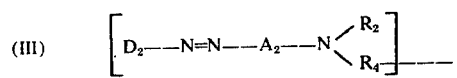

are linked through a divalent bridge member Z, in which formulae $R_1$, $R_2$ and $R_3$ each represents a hydrowhere $D_1$ and $D_2$ each represents the residue of a diazo component of the benzene or naphthalene series containing at least one and not more than three sulpho groups and if desired a fibre-reactive group; X, Y and $Y_1$ each represents hydrogen, trifluoromethyl, alkanesulphonyl, alkyl, alkoxy, aryloxy, halogen or acylamino; $R_1$, $R_2$ and $R_3$ each represents hydrogen, alkyl or substituted alkyl; $n = 1$, 2 or 3 and Z' represents a bridge member of the formula (VI)    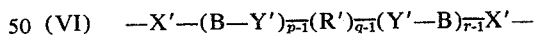

where B represents a CO, $SO_2$ or lower alkylene bridge; X' and Y' each represents an oxygen atom or a nitrogen (especially an —NH) bridge or a direct linkage, and the two X's or Y's and B may be different from each other; R' represents a substituted or unsubstituted heterocyclic residue; p, q and r may each be equal to 1 or 2, but the sum p+q+r must be at least 4. It is obvious that the residues $D_1$, $D_2$, $R_1$, $R_2$, $R_3$, X, Y and $Y_1$ present on both sides of the bridge member Z' may be different from each other.

The new dyestuffs may be obtained for example by either (a) reacting two dyestuffs of the formula (Ia)    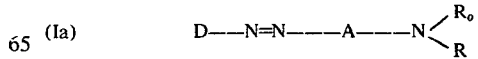

with each other or with a bifunctional compound containing two reactive atoms or groups terminally bound to a bridge Z, which may react with the reactive atoms or groups of the azo dyestuffs. In formula (Ia) D,A,R₀ and R have the abovementioned meanings but in the residue A or R₀ and/or R one hydrogen atom is replaced by a reactive atom or a reactive group. For instance, two azo dyestuffs of the formula

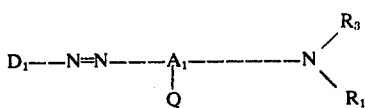
(IIa)

or

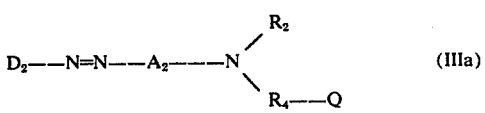
(IIIa)

where Q represents a reactive atom or a reactive group, for example a carboxyl or sulphonic acid group or their acid halides, or an acylatable group, especially an amino, mercapto or hydroxyl group or their reactive derivatives, and where $R_1$, $R_2$, $R_3$, $R_4$, $A_1$, $D_1$ and $D_2$ have the above meanings, but where $R_4$ may also represent a direct linkage, may be reacted together or with a bifunctional compound of the formula (VI a)      Q′—Z—Q′ where Z has the above mentioned meaning and both the Q′ 's represent reactive atoms or reactive groups as defined for Q which may react with Q; or b. a compound, consisting of two coupling components of the formula

(Ib)

which are linked through a bridge member Z, may be coupled on both sides with diazo compounds of amines of the formula D—NH₂; for example, a compound, containing two residues of coupling components of the formulae

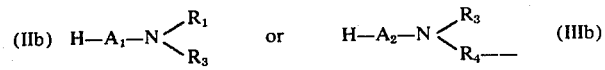

linked together through a bridge member Z, where $A_1$, $A_2$, $R_1$, $R_2$, $R_3$, $R_4$ and Z have the above meanings, may be coupled with diazo compounds of amines of the formulae D₁—NH₂ and D₂—NH₂; or c. substituents may be subsequently introduced into the disazo or polyazo dyestuffs produced by coupling or condensation, for instance a reactive group by acylation.

Azo dyestuffs having the same components A, $A_1$, $A_2$, D, $D_1$, $D_2$, $R_1$, $R_2$, $R_3$ and $R_4$ may be used for the various processes so that symmetrical disazo or polyazo dyestuffs are obtained; likewise, starting materials may be used in which one or more of these components are different so that asymmetrical disazo or polyazo dyestuffs are obtained. The two residues Q or Q′ may of course also be different from each other.

Suitable azo dyestuffs for the process (a) are those which may be obtained by coupling diazo compounds of amines containing sulpho groups, preferably those of the aromatic or heterocyclic series, with any desired coupling components which must contain a reactive atom bound to the nucleus or to an N-alkyl residue, or a reactive group of the type mentioned above.

The following amines containing sulpho groups but no fibre-reactive residue may be mentioned:

amines of the benzene series, for example o-, m- or p-aminobenzene-sulphonic acid, 1-aminobenzene-2,4- or 2,5-disulphonic acid, 4-aminodiphenyl sulphonic acid;

amines of the naphthalene series, for example 1-aminonaphthalene-4-, -5-, -6-, -7- or -8-sulphonic acid, 2-aminonaphthalene-6-sulphonic acid, 1-aminonaphthalene-2,4-, -3,6-, -3,8- or -4,8-disulphonic acid, 2-aminonaphthalene-4,8-, -5,7- or -6,8-disulphonic acid, 1-amino-4-benzoylaminonaphthalene-3,6-, or -4,6-disulphonic acid, 2-aminonaphthalene-1,5,7-trisulphonic acid, 1-aminonaphthalene-2,4,8-, -3,6,8- or -4,6,8-trisulphonic acid;

amines of the pyrene series, for example 3-aminopyrene-5-sulphonic acid, 3-aminopyrene-5,8- or -5,1-disulphonic acid, 3-aminopyrene-5,8,10-trisulphonic acid;

amines of the heterocyclic series, for example 2-aminobenzthiazole-6-sulphonic acid, dehydrothiotoluidinedisulphonic acid;

amines with azo groups, for example 4-aminoazobenzene mono- or disulphonic acid;

The following may be mentioned as amines containing sulpho groups and a fibre-reactive residue:

amines of the benzene series, for example 4- or 5-acylamino-2-aminobenzene-1-sulphonic acid;

amines of the naphthalene series, for example 2-acylamino-6-aminonaphthalene-1,5-disulphonic acid;

amines of the stilbene series, for example 4-acylamino-4′-aminostilbene-2,2′-disulphonic acid;

amines with azo groups, for example 4-acylamino-4′-aminoazobenzene-2-sulphonic acid.

Amines without sulphonic acid groups bound to the nucleus may also be used, provided that the fibre reactive acylamino residue contains a sulphonic acid group. The following may be mentioned as examples:

amines of the benzene series, for example 2-, 3-, or 4-acylaminoaniline, 2- or 4-acylamino-4′-aminodiphenyl, 2- or 4-acylamino-2′-aminodiphenyl and the corresponding diphenyl oxides, sulphones or methanes;

amines of the naphthalene series, for example 1-acylamino-5-aminonaphthalene.

The amines mentioned here are by no means the only compounds suitable as the diazo components. Inter alia, amines having carboxyl groups as the groups imparting solubility in water, for example anthranilic acid and amines containing other substituents, for example hydroxyl groups, for example aminophenols, aminonaphtholsulphonic acid and others may also be used. Metal complexes, for example Cu, Ni or Co complexes may be used, provided complex forming substituents are present in the o-position to the azo groups.

The fibre-reactive acylamino residue may be introduced according to the usual methods by selective acylation of one of the amino groups of the diazo component or of the finished azo dyestuff. The following may be mentioned as acylating agents containing a fibre-reactive residue:

β-chloroacetyl chloride or bromide, β-chloro- or β-bromo-propionyl chloride or bromide, α, β-dichloro- or dibromo-propionyl chloride or bromide, acryl chloride, α-chloro- or α-bromoacryl chloride or bromide, trichloroacryl chloride, chloroacrotonyl chloride, propiolic acid chloride, 3-nitro-4-chlorobenzenesulphonic acid or carboxylic acid chloride, 2,2,3,3-tetrafluorocyclobutane-1-carboxylic acid chloride and especially heterocyclic acid halides and their derivatives, for example the 2-chlorobenzoxazole carboxylic acid chlorides, 2-chlorobenzthiazole carboxylic or sulphonic acid chlorides, and especially the following compounds containing at least 2 nitrogen atoms as the hetero atoms of a 6-membered heterocycle:

4,5-dichloro-1-phenylpyridazone carboxylic or sulphonic acid chloride, 4,5-dichloropyridazone propionic acid chloride, 1,4-dichlorophthalazine carboxylic or sulphonic acid chloride, 2,3-dichloroquinoxaline carboxylic or sulphonic acid chloride, 2,4-dichloroquinoxaline carboxylic or sulphonic acid chloride, 2-methanesulphonyl-4-chloro-6-methylpyrimidine, tetrachloropyridazine, 2,4-bis-methanesulphonyl-6-methylpyrimidine, 2,4,6-tri- or 2,4,5,6-tetrachloropyrimidine, 2,4,6-tri- or 2,4,5,6-tetrabromopyrimidine, 2-methanesulphonyl-4,5-dichloro-6-methylpyrimidine, 2,4-dichloropyrimidine-5-sulphonic acid, 5-nitro- or 5-cyano-2,4,6-trichloropyrimidine, 2,6-bis-methanesulphonylpyridine-4-carboxylic acid chloride, 5-nitro-6-methyl-2,4-dichloropyrimidine, 2,6-dichloropyrimidine-4-carboxylic acid chloride, 2,6-dichloropyrimidine-5-carboxylic acid chloride, 2,4-dichloropyrimidine-4-sulphonic acid chloride, 2,4-dichloropyrimidine-5-sulphonic acid chloride, 2,4,6-trichloro-1,3,5-triazine, as well as 2,4,6-tri-(benzenesulphonyl)-1,3,5-triazine and 4,6-dichloro-1,3,5-triazines substituted in the 2-position by an aryl or alkyl residue, for example a phenyl, methyl or ethyl residue, or by a residue of an aliphatic or aromatic mercapto compound bound through the sulphur atom or hydroxyl compound bound through the oxygen atom, or especially by an $NH_2$-group or by the residue of an aliphatic, heterocyclic or aromatic amino compound bound through the nitrogen atom. Compounds in which the residues may be bound to the triazine nucleus in the 2-position by a reaction with trihalogen triazines are, for instance, the following:

aliphatic or aromatic mercapto or hydroxyl compounds, for example thioalcohols, thioglycollic acid, thiourea, thiophenols, methanol, ethanol and isopropanol, glycollic acid, phenol, chloro- or nitrophenols, phenol carboxylic and sulphonic acids, naphthols, naphtholsulphonic acid and so on, but especially ammonia and compounds containing acylatable amino groups, for example hydroxylamine, hydrazine, phenylhydrazine, phenylhydrazine sulphonic acids, carbamic acid and its derivatives, semi- and thiosemicarbazides and -carbazones; methyl-, ethyl-, isopropyl-, methoxyethyl-, methoxypropylamine; dimethyl-, diethyl-, methylphenyl-, ethylenephenylamine, chloroethylamine, ethanolamines, propanolamines, benzylamine, cyclohexylamine, morpholine, piperidine, piperazine, aminocarbonic acid esters, glycine ethyl ester, aminoethanesulphonic acid, N-methylaminoethanesulphonic acid, especially aromatic amines, for example aniline, N-methylaniline, toluidines, xylidines, chloranilines, p- or m-aminoacetanilide, nitroanilines, aminophenols, nitrotoluidines, phenylenediamines, toluylenediamines, anisidine, phenetidine, diphenylamine, naphthylamines, aminonaphthols, diaminonaphthalenes and especially anilines containing acidic groups, for example sulphobenzylamine, sulphanilic, metanilic or orthanilic acid, aniline disulphonic acids, aminobenzyl sulphonic acids, aniline-ω-methanesulphonic acid, aminodibenzoic acids, naphthylamino mono-, di- and trisulphonic acids, aminobenzoic acids, for example 2-hydroxy-5-aminobenzoic acid, aminonaphtholmono-, -di- and -trisulphonic acid and so on, coloured compounds or compounds having dyestuff characteristics, for example 4-nitro-4'-amino-stilbene disulphonic acid, 2-nitro-4'-aminodiphenylamino-4,3'-stilbene disulphonic acid, 2-nitro-4'-aminodiphenylamine-4,3'-disulphonic acid and especially aminoazo dyestuffs or aminoanthraquinones or phthalocyanines that contain at least one reactive amino group.

The introduction of the substituent into the 2-position of the triazine residue may be carried out after the condensation with the starting diamine or after the production of the dyestuff.

Other examples of fibre-reactive residues, apart from those introduced by acylation, are the following: the vinylsulpho, the β-sulphato- or thiosulphatoethylsulphone, the β-thiosulphatopropionylamido-, the β-thiosulphatoethylsulphonyamido- or the sulphonic acid-N,β-sulphatoethylamido groups, which may be introduced in some other way, preferably into the diazo component, for example by ester or thioester formation.

The amines or aminosulphonic acids used in the process of the present invention or acyl derivatives thereof may be diazotized and coupled in the usual manner.

The coupling may take place in the presence of agents that strongly favour coupling in the 4-position to the amino group or hinder coupling in a position adjacent to the amino group.

The coupling components of the benzene or naphthalene series to be coupled with the diazo compounds of the above mentioned amines must contain a reactive atom or a reactive group and must be capable of coupling in the para-position to an amino group. This atom or group may be linked either directly or through an alkylene bridge to the benzene or naphthalene nucleus; or the reactive atom or reactive group may be bound to the coupling component through an N-alkylene bridge of the amino group.

Coupling components may have the following formulae, for example

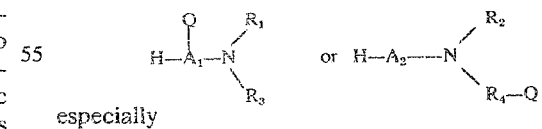

especially

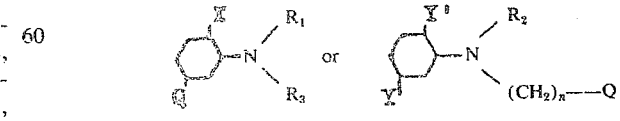

in which $A_1$, $A_2$, $R_1$, $R_3$, Q, n, X, Y and Y' have the meanings given for formulae (IIa), (IIIa), (IV), (V) and (VI). X and Y' preferably each represents a hydrogen atom, a methyl, ethyl, methoxy, ethoxy, phenthio or phenoxy group and Y represents one of the above mentioned substituents or a chlorine or bromine atom, a trifluoromethyl or an acylamino group, in which the acyl residue may be the residue of an organic monocarboxylic acid, an organic monosulphonic acid, for example methane-, ethane- or p-toluene monosulphonic acid, or the residue of a carbamic acid or of a carbonic acid monoester or monoamide, for example phenoxycarbonyl, methoxycarbonyl or aminocarbonyl.

The groups $R_1$, $R_2$ and $R_3$ may each represent a hydrogen atom, an alkyl or substituted alkyl group, for example a halogenated alkyl group, for example β-chloroethyl, β, β, β-trifluoroethyl, β, γ-dichloropropyl, β-cyanoethyl; alkoxyalkyl, for example β-ethoxyethyl or δ-methoxybutyl; hydroxyalkyl, for example β-hydroxyethyl, β, γ-dihydroxypropyl; nitroalkyl, for example β-nitroethyl; carbalkoxy, for example β-carbo(methoxy, ethoxy or propoxy)ethyl, β- or γ-carbo(methoxy or ethoxy)propyl; acylaminoalkyl, for example β-(acetyl or formyl)aminoethyl; acyloxyalkyl, for example β-acetyloxyethyl, β, γ-diacetoxypropyl; β-(alkyl or aryl)-sulphonylalkyl, for example β-methanesulphonylethyl, β-ethanesulphonylethyl or β-(p-chlorobenzenesulphonyl)ethyl; alkyl- or arylcarbamoyloxyalkyl, for example β-methylcarbamyloxyethyl and β-phenylcarbamyloxyethyl; alkoxycarbonyloxyalkyl, for example β-(methoxy, ethoxy or isopropoxy)carbonyloxyethyl, γ-acetamidopropyl, β-(p-nitrophenoxy)ethyl, β-(p-hydroxyphenoxy)ethyl, β, β(β'-acetylethoxycarbonyl)-ethyl, β-[β'-(cyano, hydroxy, methoxy or acetoxy)ethoxycarbonyl]-ethyl, cyanoalkoxyalkyl, β-carboxyethyl, β-acetylethyl, γ-aminopropyl, β-diethylaminoethyl, β-cyanoacetoxyethyl and β-benzoyloxyethyl groups. These groups generally contain no more than eight carbon atoms and preferably no more than six.

Tetrahydroquinoline or benzomorpholine or their derivatives for example, are used as the coupling component when the group $R_1$, $R_2$ or $R_3$ is bound to a ring with the aromatic nucleus.

The following may be mentioned as examples of such coupling components in which Q in the formulae given represents a reactive atom or a reactive group of the given type, for example, a halogen atom, a sulphato group or an aryl or alkylsulphonyloxy group:

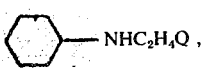
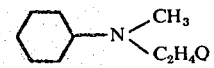
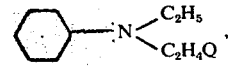
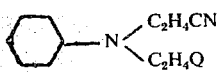
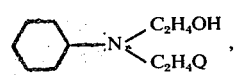
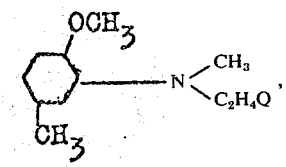
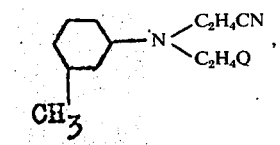
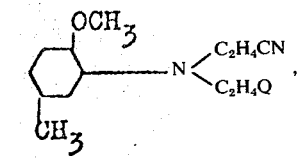
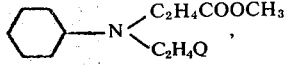
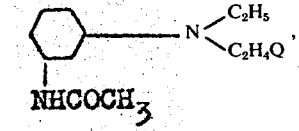
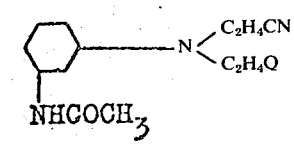
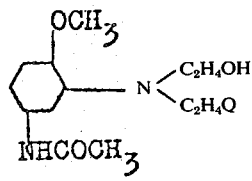
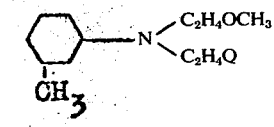
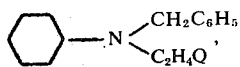
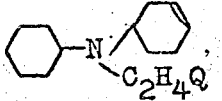
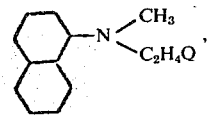
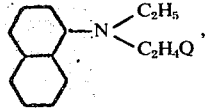
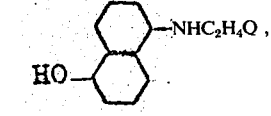
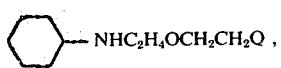
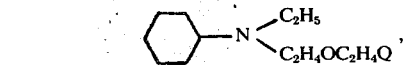
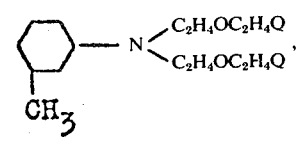
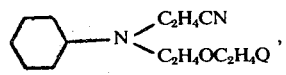

-Continued

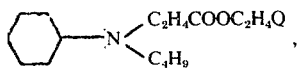 , 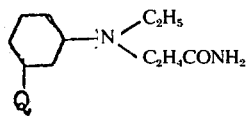

The azo dyestuffs obtained from the abovementioned diazo and coupling components by coupling and if desired subsequent acylation and which contain in the residue of the coupling component a reactive atom or a reactive group, may be linked by condensation with bifunctional compounds or directly with each other according to production method a), simultaneously or in any desirable sequence. Ester or amide bridges may be formed during this process, for instance by the reaction of acids, especially carboxylic acids or their derivatives, for example anhydrides, esters, halides or of isocyanates with hydroxy or amino compounds. Oxygen or nitrogen bridges may be formed, for instance by the reaction of hydroxy or amino compounds with compounds containing readily splittable multi-valent bonds or readily removable groups (for instance sulphato groups) or atoms (for example halogen atoms), or of compounds with readily openable heterocyclic rings (for example epoxy compounds) with compounds containing readily removable hydrogen atoms. These reactive atoms or groups correspond to the abovementioned residues defined as Q or Q'; they may be present in the coupling components or the compounds used for linking. For example, the hydroxyl, amino or epoxide groups may occur in the compound Q'—Z—Q' (as Q') and the acids or acid derivative groups or hydrogen atoms in the coupling components of the azo dyestuffs reacting with those groups may occur in these dyestuffs, (as Q or vice versa); or the compound Q'—Z—Q' may, for example, contain a hydroxyl, amino or epoxide group on one side and a reactive hydrogen atom or an acid or an acid derivative group on the other. The reaction of the azo dyestuffs with the compounds used as the bridge member is carried out by the usual methods.

The bridge members formed during the reaction have preferably the general composition given in formula VI and correspond, for example, to the following formulae:

—X''—CO—R''—COX'', —X''—CO—NH—R''—NH—CO—X'' or —OCOY''λ'—R''—Y''—OCO— or

—X''—SO$_2$—R''—SO$_2$—X''—, —X''—SO$_2$—NH—R''—NH—SO$_2$—X'' or

—OSO$_2$Y''—R''—Y''—OSO$_2$—, where X'' and Y'' each represents —O—, —S—, —NR''— or —NH—; and R'' represents a substituted or unsubstituted heterocyclic bridge.

The following acids (or their halides, anhydrides, or esters) are examples of suitable bifunctional reactants: 2,5-thiophenedicarboxylic acid, furandicarboxylic acid, pyridinedicarboxylic acid, and also the heterocyclic diisocyanates (which may be prepared in situ), for example, diisocyanates of benzofuran or those containing urea or uretdione groups, for example, 1,3-bis-(4'-methyl-3'-isocyanatophenyl)-uretdione.

The production of carbonic acid diesters or diamide (= urea) bridges or of carbamic acid ester bridges may be carried out directly with phosgene or in steps, that is by first producing the chloroformic acid ester of one azo dyestuff. Bis-carbonic acid diester or diamide (= bis-urea) bridges or bis-carbamic acid ester bridges or combinations of such bridges may be obtained by reacting 2 mols of the chloroformic acid ester of an azo dyestuff with one mol of a diol, a diamine or a dithiol to obtain diurethane, bis-(thiourethane) or a bis-urea compound.

The dyestuffs of the present invention may also be obtained according to the production method (b) by coupling two coupling components (bound to each other through a bridge linkage) with diazotized amines. Examples of suitable coupling components are the following of the formulae

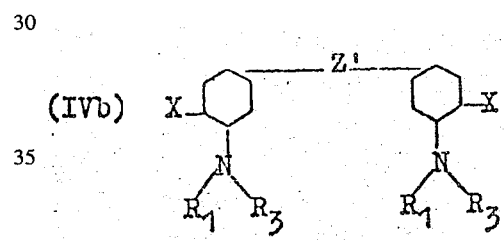

(IVb)

or

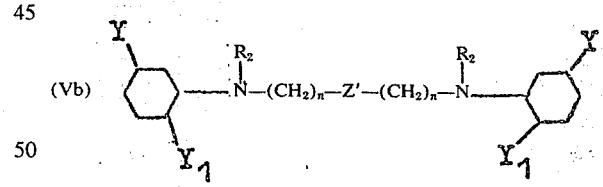

(Vb)

in which X, Y, Y$_1$, Z', R$_1$, R$_2$, R$_3$ and n have the same meanings as given for formulae (IV) and (V).

Such bifunctional coupling components may be manufactured in principle in the same manner as described for method (a) for the linking of azo dyestuffs. Method (b) is specially suitable for the production of dyestuffs containing a bridge linkage bound to the nucleus of the coupling component, since a large number of readily available starting materials exist, which may be easily linked due to the presence of reactive, nucleus-bound atoms, for example, hydrogen atoms or groups, for example, the isocyanate, carboxyl or hydroxyl groups, or of nucleus-bound groups capable of conversion into reactive groups (for example by the reduction of nitro groups to amino groups or by chlorination of carboxyl groups to carboxychloride groups), and in which the amino group para to the coupling position need not be present at the start but may be produced subsequently, for instance by reducing a nitro group (which may be followed by a conversion into a secondary or tertiary amino group).

When at least one of the two azo residues is directly bound to the bridge linkage the diamines used as bifunctional coupling components are new compounds, i.e. they correspond for example to formula (IVb) and form part of the invention. They are manufactured as mentioned above by linking, often advantageously using as starting materials aromatic nitro compounds and reducing the bis-nitro compounds obtained after the linkage by known methods (for instance catalytically or in the presence of acids) and if desired followed by alkylation, for instance, by reaction with alkyl halides, for example, ethyl chloride, monoepoxides, for example, ethylene oxide, halogenhydrine, for example, ethylene chlorohydrin or ethyleneimine, and, if desired, carrying out further reactions with the alkyl groups present at the nitrogen atom, for instance, acylating β-hydroxy or β-aminoethyl groups with acid chlorides, anhydrides or isocyanates.

Other methods of production are available apart from the two above-mentioned most usual methods by condensation or addition of the two azo dyestuffs to the compound used as the bridge linkage, or by coupling the two diazo components to a compound linked to both coupling components through a bridge linkage. For instance, in method (c) a fibre reactive residue may be introduced into disazo or polyazo dyestuffs that already contain two azo dyestuff residues bound through a bridge member, and of which at least one contains an acylatable group (especially an amino group) in the diazo component, by subsequent condensation with acylating agents containing a fibre-reactive residue. Suitable acylating agents are those mentioned above. Subsequently, if desired, (for instance after acylation with a trihalogen triazine) a halogen atom in the triazine ring may be replaced, for example, by an amino group.

The dyestuffs obtained by the present process and its variants are new substances. They are suitable for dyeing and printing the most varied materials, for example of animal origin, for example, leather, silk, wool and especially polyamide fibres as well as polyurethanes or mixtures containing such fibres; the fibre-reactive dyestuffs are also suitable for dyeing cellulosic fibres, for example, cotton. Wool and polyamide fibres may be dyed in a neutral or especially a weakly acidic bath, for example, an acetic acid bath. It is recommended in certain cases to add polyglycol ether derivatives to the dyebath so as to obtain uniform dyeing, especially when using dyestuffs with reactive groups, and is especially recommended for wool. These polyglycol ether derivatives should contain on the average at least ten —CH$_2$—CH$_2$—O— groups and be derived from monoamines containing an aliphatic hydrocarbon residue of at least 20 carbon atoms. The new dyestuffs take very well to polyamide fibres, and the resultant colorations and prints exhibit excellent light and wet fastness, especially good fastness to washing, fulling and water and frequently require no further treatment. Wool dyed with fibre-reactive dyestuffs also exhibits good fastness to perspiration.

Dyestuffs containing reactive groups are also suitable for dyeing and printing cellulosic materials. In this case, however, the dyestuffs of the present invention require fixation by heat treatment in the presence of alkali, for example, sodium carbonate, sodium hydroxide or trisodium phosphate.

Unless otherwise indicated, parts and percentages in the following Examples are by weight and temperatures are given in degrees centigrade.

EXAMPLE 1

5.06 Parts of aniline-2,5-disulphonic acid are dissolved in 125 parts of water and to the solution 5 parts of concentrated hydrochloric acid and 5 parts of a 4N NaNO$_2$ solution are added. The resultant diazo solution is added dropwise at a temperature between 5° to 10° to a solution of 6.96 parts of the amide of thiophene-2,5-dicarboxylic acid and N-bis-β-acetoxyethyl-3-aminoaniline in 100 parts of acetone, 20 parts of concentrated hydrochloric acid and 80 parts of water. The resultant mixture is stirred overnight at a temperature between 0° to 5°C, adjusted to a pH-value between 6.5 to 7 with a 30% solution of sodium hydroxide and evaporated in a rotary evaporator. A salt-containing dyestuff corresponding to the formula

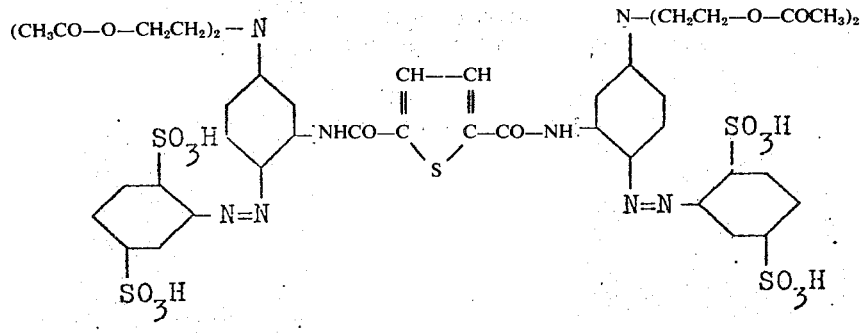

is obtained, which dyes nylon yellow tints fast to wetting and light.

The amines shown in column I of the following Table may be diazotized in a like manner and coupled at a molar ratio of 2:1 with the coupling componenets shown in column II to obtain dis- or tetrakisazo dyestuffs which dye nylon the shades shown in column III.

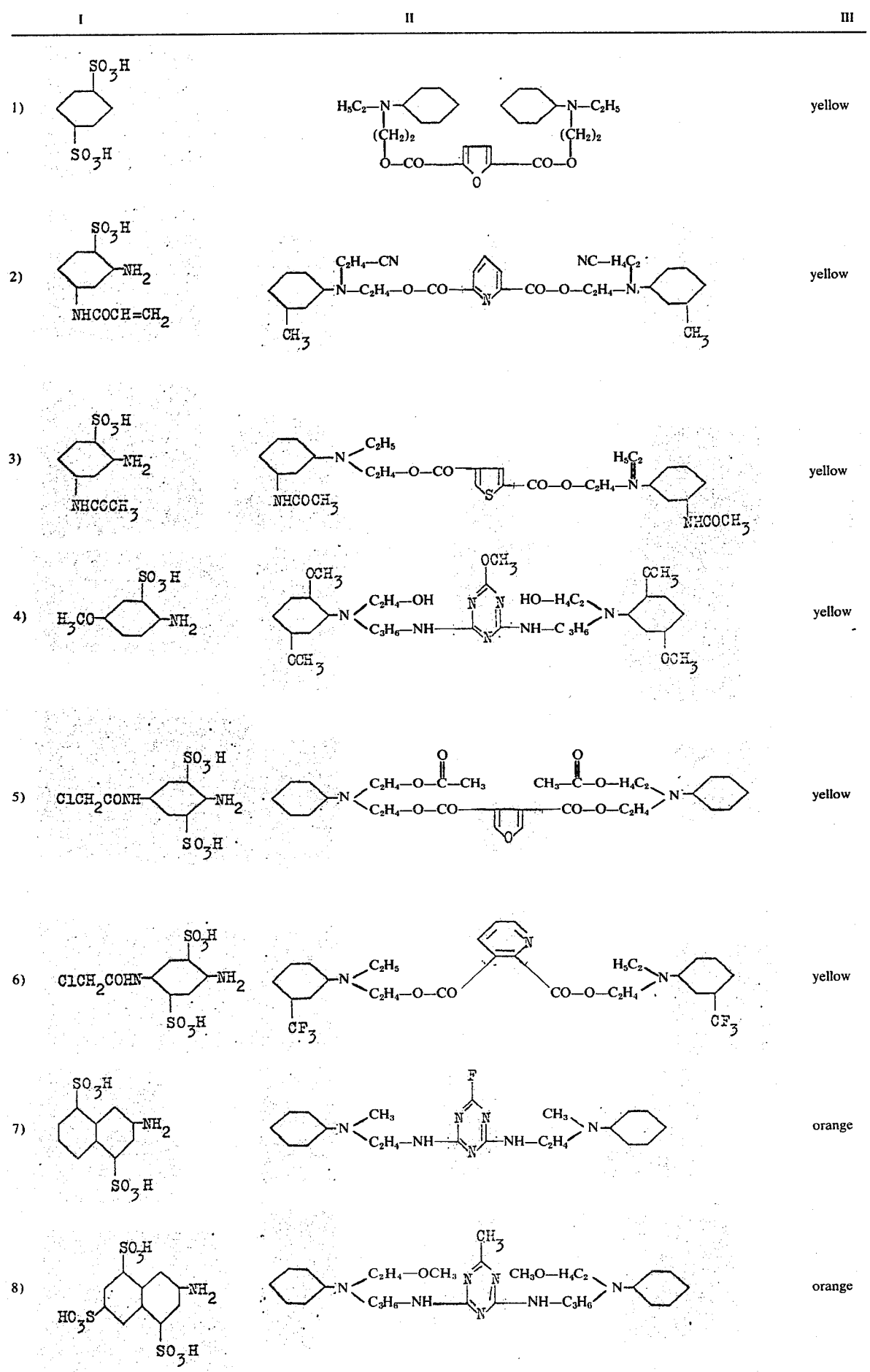

-Continued

| I | II | III |
|---|---|---|
| 9) (structure) | (structure) | orange |
| 10) (structure) | (structure) | orange |
| 11) (structure) | (structure) | claret |
| 12) (structure) | (structure) | orange |
| 13) (structure) | (structure) | scarlet |
| 14) (structure) | (structure) | yellow |
| 15) (structure) | (structure) | orange |

—Continued

| I | II | III |
|---|---|---|
| 16) (decalin with HO₃S, SO₃H, SO₃H, NH₂ substituents) | cyclohexyl-N(C₂H₅)-C₂H₄-NH— [4,5-dichloropyrimidine, 2-Cl] —NH-C₂H₄-N(C₂H₅)-cyclohexyl | orange |
| 17) (cyclohexane with SO₃H, NH₂, SO₃H) | (3-Cl-cyclohexyl)-N(C₂H₄-OH)-C₃H₆-NH— [4,5-dichloro-2-Cl-pyrimidine] —NH-C₃H₆-N(C₂H₄-OH)-(3-Cl-cyclohexyl) | yellow |
| 18) BrCH₂CHCONH— (cyclohexane with SO₃H, NH₂, SO₃H); Br on CH | (2-CH₃-cyclohexyl)-N(C₂H₄-OCH₃)-C₃H₆-NH— [4,5-dichloro-2-Cl-pyrimidine] —NH-C₃H₆-N(CH₃O-C₂H₄)-(2-CH₃-cyclohexyl) | orange |
| 19) CH₂=CHCONH— (cyclohexane with SO₃H, NH₂, SO₃H) | (2-OCH₃-cyclohexyl)-N(C₂H₅)-C₂H₄-NH— [4,5-dichloro-2-Cl-pyrimidine] —NH-C₂H₄-N(C₂H₅)-(2-OCH₃-cyclohexyl) | orange |
| 20) ClCH₂CONH— (cyclohexane with SO₃H, NH₂) | (2-CH₃-cyclohexyl)-N(CH₃)-C₃H₆-NH— [4,5-dichloro-2-Cl-pyrimidine] —NH-C₂H₄-N(CH₃)-(2-CH₃-cyclohexyl) | orange |
| 21) (cyclohexane with SO₃H, NH₂, SO₃H) | (3-CH₃-cyclohexyl)-N(C₂H₄-CN)-C₂H₄-O-CO— furan —CO-O-C₂H₄-N(C₂H₄-CN)-(3-CH₃-cyclohexyl) | yellow |
| 22) (cyclohexane with SO₃H, NH₂) | ″ | yellow |
| 23) CH₂—CHBr / Br / CONH—CH₂— (cyclohexane with SO₃H, NH₂) | ″ | yellow |

-Continued
| I | II | III |
|---|---|---|
| 24) 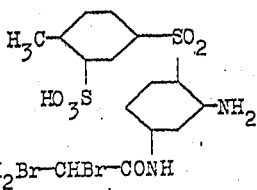 | " | scarlet |
| 25) 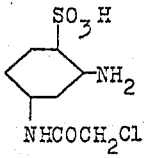 | " | yellow |
| 26) 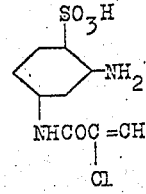 | " | yellow |
| 27) 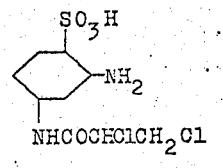 | " | yellow |
| 28) 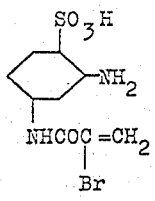 | " | yellow |
| 29) 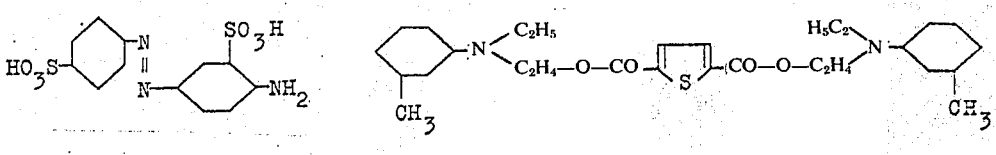 | 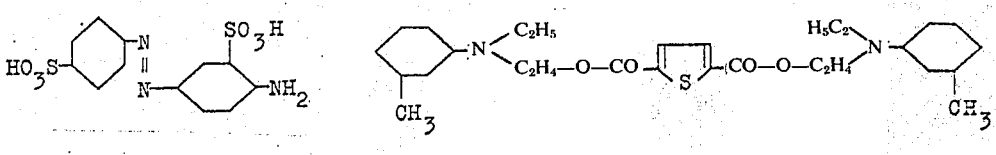 | claret |
| 30) 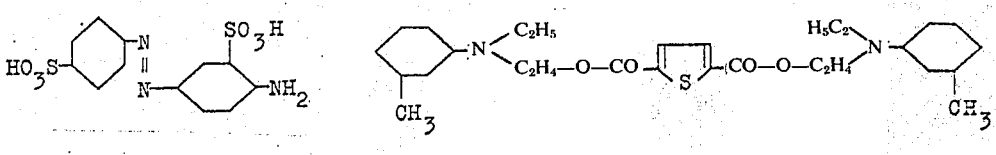 | " | orange |
| 31) 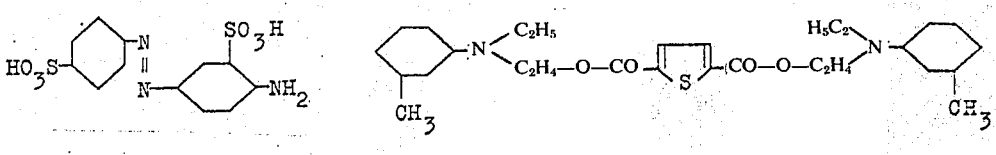 | " | orange |
| 32) (structure with $SO_3H$, $NH_2$, $CH_3CONH$) | " | orange |

| I | II | III |
|---|---|---|
| 33) [structure: methylbenzene with SO2, HO3S-NH, CH2Br-CHBr-CO, NH2] | 5 " | scarlet |
| 34) [structure: CH2Br-CHBr-CONH-benzene-SO3H, NH2] | " | orange |
| 35) [structure: CH2Br-CHBr-CONH-benzene with 2×SO3H, NH2] | " | yellow |
| 36) [structure: O2N-benzene-SO3H, NH2] | " | claret |
| 37) [structure: naphthalene with 2×SO3H, NH2] | [structure: bis-diethylamino-methoxy-phenyl thiophene dicarboxamide] | orange |
| 38) [structure: naphthalene with 3×SO3H, NH2] | [structure: bis-(methoxyethyl)amino-phenyl furan dicarboxamide] | orange |
| 39) [structure: benzene with 2×SO3H, NH2] | [structure: bis-dimethylamino-phenyl furan dicarboxamide] | yellow |
| 40) [structure: methylbenzene with SO2, HO3S, CH2Br-CHBr-CO-NH, NH2] | [structure: bis-diethylamino-methyl-phenyl thiophene dicarboxamide] | orange |
| 41) [structure: methylbenzene with HO3S, SO2, BrCH2-CHBr-COHN, NH2] | [structure: bis-dimethylamino-phenyl thiophene diester] | scarlet |

—Continued

| | I | II | III |
|---|---|---|---|
| 42) | (cyclohexane with SO₃H, NH₂, SO₃H) | triazine with Cl, two N(C₂H₅)₂ substituents linked via NH-cyclohexyl groups | reddish-yellow |
| 43) | (cyclohexane with SO₃H, NH₂, SO₃H) | thiophene-2,5-dicarboxamide linked to two cyclohexyl-N(C₂H₄OCH₃)₂ groups | yellow |
| 44) | (cyclohexane with SO₃H, NH₂) | " | yellow |
| 45) | CH₂Br–CHBr–CONH–(cyclohexane with SO₃H, NH₂) | thiophene-2,5-dicarboxamide linked to two cyclohexyl-N(C₂H₄OCH₃)₂ groups | yellow |
| 46) | (cyclohexane with CH₃, SO₂, HO₃S, NH₂) CH₂Br–CHBr–CONH– | " | scarlet |
| 47) | (cyclohexane with SO₃H, NH₂, NHCOCH₂Cl) | " | yellow |
| 48) | (cyclohexane with SO₃H, NH₂, NHCOC(Cl)=CH₂) | " | yellow |
| 49) | (cyclohexane with SO₃H, NH₂, NHCOCHClCH₂Cl) | " | yellow |

| | I | II | III |
|---|---|---|---|
| 50) | [structure: cyclohexane with SO₃H, NH₂, NHCOC(Br)=CH₂] | " | yellow |
| 51) | [structure: HO₃S-cyclohexyl-N=N-cyclohexyl(SO₃H)(NH₂)] | [structure: N(C₂H₄-OCOCH₃)₂ cyclohexyl-NH-CO-thiophene-CO-NH-cyclohexyl-N(C₂H₄OCOCH₃)₂] | claret |
| 52) | [structure: CH₂Br-CHBr-CONH, HO₃S, NH₂, SO₃H on cyclohexane] | " | orange |
| 53) | [structure: decalin with SO₃H, HO₃S, NH₂] | " | orange |
| 54) | [structure: cyclohexane with SO₃H, NH₂, CH₃CONH] | " | orange |
| 55) | [structure: H₃C, HO₃S-cyclohexyl-SO₂-NH-cyclohexyl-NH₂, CH₂Br-CHBr-CO] | " | scarlet |
| 56) | [structure: CH₂Br-CHBr-CONH-cyclohexyl(SO₃H)(NH₂)] | " | orange |
| 57) | [structure: CH₂Br-CHBr-CONH-cyclohexyl(SO₃H)(NH₂)(SO₃H)] | " | yellow |
| 58) | [structure: cyclohexane with SO₃H, O₂N, NH₂] | " | claret |

| I | II | III |
|---|---|---|
| 59) [structure: cyclohexane with SO₃H, NH₂, SO₃H] | [structure: triazine with Cl, bridged by (C₂H₅)N-C₂H₄NH- to methylcyclohexyl groups on both sides] | yellow |
| 60) [structure: cyclohexane with SO₃H, NH₂, SO₃H] | [structure: triazine with Cl, (C₂H₅)N-C₂H₄NH- methylcyclohexyl on left, (HOC₂H₄)N-C₃H₆NH- cyclohexyl on right] | yellow |
| 61) [structure: cyclohexane with SO₃H, NH₂, NHCOCHCH₂Br/Br] | [structure: triazine with OCH₃, (C₂H₄OCH₃)N-C₂H₄NH- chlorocyclohexyl on left, (H₅C₂)N-C₂H₄NH- methoxycyclohexyl on right] | yellow |
| 62) [structure: HO₃S-cyclohexyl-N=N-cyclohexyl with SO₃H and NH₂] | [structure: triazine with C₂H₅, (C₂H₅)N-C₂H₄NH- CF₃-cyclohexyl on left, (CH₃)N-C₂H₄- cyclohexyl on right] | claret |
| 63) [structure: ClCH₂CONH-cyclohexyl with SO₃H and NH₂] | [structure: triazine with F, (H₅C₂)₂N-cyclohexyl-NH- on left, (H₅C₂)₂N-methoxycyclohexyl-NH- on right] | reddish-yellow |
| 64) [structure: HO₃SOCH₂CH₂SO₂-cyclohexyl-NH₂] | [structure: pyrimidine with Cl, Cl, Cl, (C₂H₄OH)(C₃H₆NH)N-chlorocyclohexyl on left, (H₅C₂)(C₂H₄)N-cyclohexyl on right] | yellow |
| 65) [structure: HO₃SOCH₂CH₂NHSO₂-cyclohexyl with NH₂] | [structure: pyrimidine with Cl, Cl, (CH₃)(C₂H₄NH)N-methoxycyclohexyl on left, (HO-H₄C₂)(C₃H₆)N-methylcyclohexyl on right] | yellow |

| I | II | III |
|---|---|---|
| 66) | | orange |
| 67) | | yellow |
| 68) | | orange |

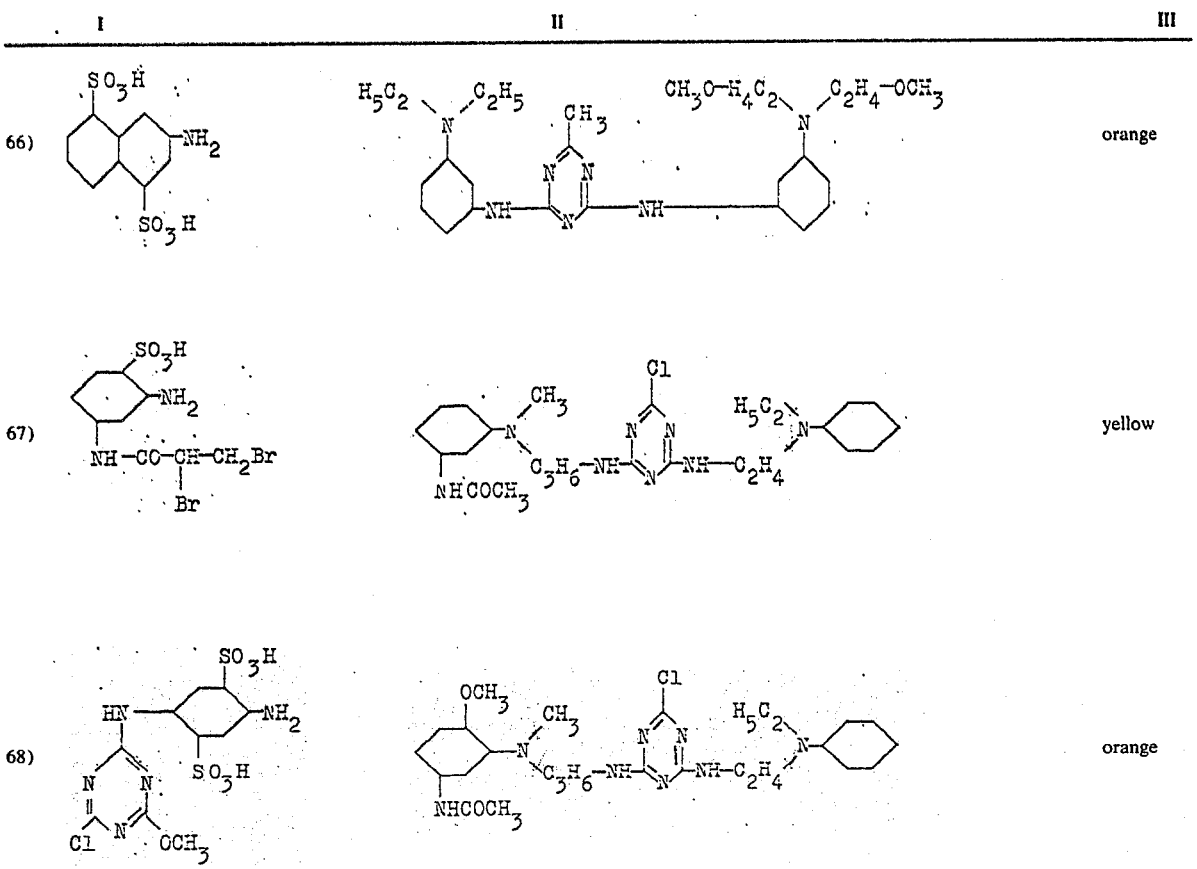

EXAMPLE 2

44.2 Parts of the azo dyestuff of the formula

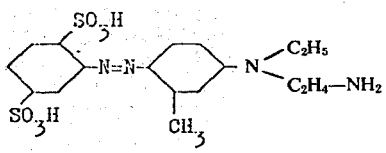

are dissolved in the form of the disodium salt in 500 parts of water. The neutralised solution is cooled to 0°C by addition of ice and 9.25 parts of finely powdered cyanuric chloride are added. Dilute sodium hydroxide solution is run into the mixture at 0°5°C with thorough stirring so that the pH value is kept between 6.5 to 7. After about an hour the reaction temperature is raised to 45° to 50°C within a further hour and the pH value is maintained between 6.5 and 7. The dyestuff of the constitution is precipitated after completion of the condensation by addition of sodium chloride, filtered and dried in vacuo. It corresponds to dyestuff No. 59 of the Table of Example 1 and dyes polyamide fibres yellow tints fast to wetting and light.

According to the same method, the other dyestuffs indicated in the Table of Example 1 can be obtained if the monoazo dyestuff or (in the case of assymmetric end products) both monoazo dyestuffs are firstly manufactured, and there are subsequently condensed with the corresponding dihalogen or trihalogen triazines, tetrahalogen pyrimidines, pyrrole-, thiophene- or pyridinecarboxylic acids.

We claim:
1. A disazo dyestuff of the formula

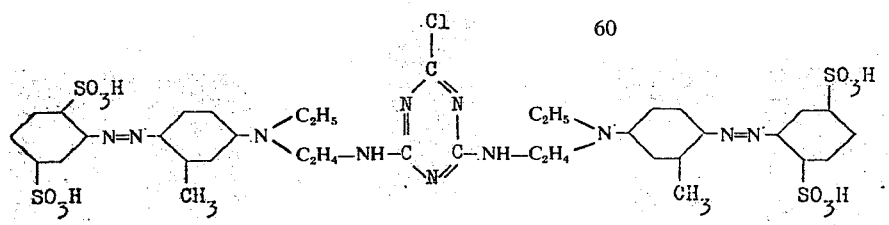

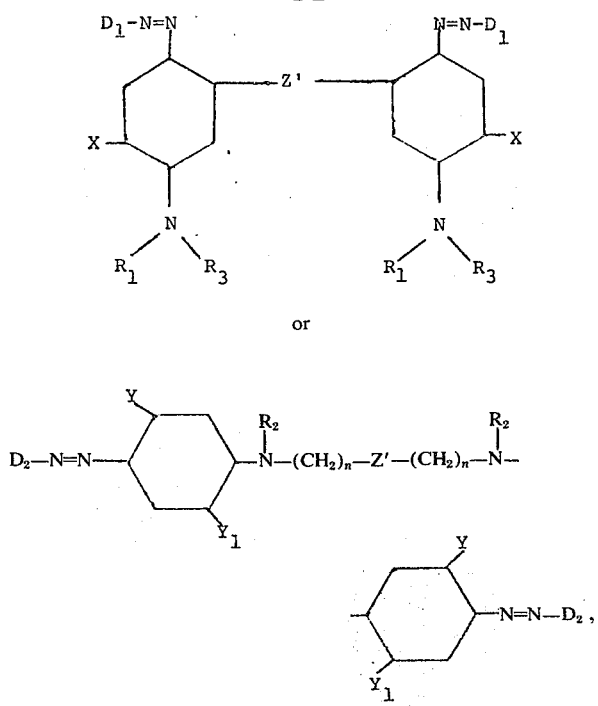

in which $D_1$ and $D_2$ each is phenyl or naphthyl containing at least one and at most three sulfo groups and which may be substituted by phenyl, methyl, chloro, methoxy, carboxy, hydroxy, acetylamino, benzoylamino, sulfophenylazo, (methyl, sulfo)-phenylsulfone, vinylsulfo, β-sulfatoethylsulfone, β-thiosulfatoethylsulphone, β-thiosulfatopropionylamido, β-thiosulfatoethylsulfonylamido, β-sulfatoethylsulfamoyl, chloroacetylamino, β-chloropropionylamino, β-bromopropionylamino, α,β-dichloropropionylamino, α,β-dibromopropionylamino, acryloylamino, α-chloroacryloylamino, α-bromoacryloylamino, trichloroacryloylamino, chlorocrotonylamino, propiolylamino, β-sulfatopropionylamino, 3-nitro, 4-chlorobenzoylamino, 3-nitro, 4-chlorobenzenesulfonylamino,2,2,3,3-tetrafluorocyclobutane-1-carboxylamino, 2-chlorobenzoxazole carboxylamino, 2-chlorobenzthiazole carboxylamino, 2-chlorobenzthiazole sulphonylamino, 2,5-dichloro-1-phenylpyridazone carboxylamino, 2,5-dichloro-1-phenylpyridazone sulphonamino, 4,5-dichloropyridazone propionylamino, 1,4-dichlorophthalazine carboxylamino, 1,4-dichlorophthalazine sulphonamino, 2,3-dichloroquinoxaline carboxylamino, 2,3-dichloroquinoxaline sulphonamino, 2,4-dichloroquinoxaline carboxylamino, 2,4-dichloroquinoxaline sulphonamino, 2-methanesulphonyl-4-chloro-6-methylpyrimidino, tetrachloropyridazino, 2,4-bis-methanesulphonyl-6-methylpyrimidino, 2,4,6-tri- or 2,4,5,6-tetrachloropyrimidino, 2,4,6-tri- or 2,4,5,6-tetrabromopyrimidino, 2-methanesulphonyl-4,5-dichloro-6-methylpyrimidino, 2,4-dichloro-5-sulfo-pyrimidino, 5-nitro- or 5-cyano-2,4,6-trichloropyrimidino, 2,6-bis-methanesulphonylpyridine-4-carboxylamino, 5-nitro-6-methyl-2,4-dichloropyrimidino, 2,6-dichloropyrimidine-4-carboxylamino, 2,6-dichloropyrimidine-5-carboxylamino, 2,4-dichloropyrimidine-4-sulfonylamino, 2,4-dichloropyrimidine-5-sulfonylamino, 2,4,6-trichloro-1,3,5-triazino, 2,4,6-tri-(benzenesulphonyl)-1,3,5-triazino or 4,6-dichloro-1,3,5-triazino substituted in the 2- position by phenyl, ethyl, methyl, methoxy, carboxymethylmercapto, ethoxy, isopropoxy, carboxymethoxy, phenoxy, chlorophenoxy, nitrophenoxy, carboxyphenoxy, sulphophenoxy, sulfonaphthoxy, amino, hydroxylamino, hydrazino, phenylhydrazino, methylamino, ethylamino, isopropylamino, methoxyethylamino, methoxypropylamino, dimethylamino, diethylamino, chloroethylamino, benzylamino, cyclohexylamino, morpholino, piperidino, piperazino, ethoxycarbonylmethylamino, sulfo-ethylamino, N-methyl sulfoethylamino, phenylamino, N-methylphenylamino, toluidino, xylidino, chlorophenylamino, nitrophenylamino, o-acetamidoanilido, p-acetamidoanilido, aminoanilino, aminotoluidino, anisidino, phenetidino, diphenylamino, naphthylamino, hydroxynaphthylamino, aminonaphthylamino, sulfobenzylamino, hydroxyphenylamino, sulfophenylamino, disulfophenylamino, β-sulfotoluidino, N-sulfomethyl anilino, bis(carboxyphenyl) amino, mono, -di-, or tri-sulfo-naphthylamino, 3-carboxy-4-hydroxyanilino, mono-, di-, or tri-sulfonaphtholamino, disulfo-4'-nitrostilbene-(4)-amino, 3', 4-disulfo-2-nitro-stilbene-4'-aminodiphenylamino, or 2-nitro, 4,3'-disulfo-4'-aminodiphenylamino, nitroanilino, nitrotoluidino, or o- or m- carboxyphenylamino;

X, Y and $Y_1$ each is hydrogen, trifluoromethyl, lower alkanesulphonyl, lower alkyl, lower alkoxy, phenoxy, chlorine, bromine or lower alkanoylamino;

$R_1$, $R_2$ and $R_3$ each is hydrogen, lower alkyl or lower alkyl substituted by cyano, hydroxyl, acetyloxy, carbomethoxy, carboethoxy, or carbopropoxy;

$n = 1$, 2 or 3 and Z' represents the bridge member of the formula $$-X'-(B-Y')_{p\text{-}1}(R')_{q\text{-}1}(Y'-B)_{4\text{-}1}X'-$$ 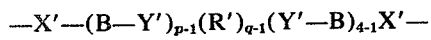

wherein B represents —CO—, —SO$_2$— or lower alkylene; X' and Y' each represents —O—, —NR$_4$—where R$_4$ is hydrogen or lower alkyl or a direct linkage; R' represents thiophene, furan, benzofuran, pyridine, pyrrole, pyrimidine substituted by chlorine, triazine substituted by chlorine, fluorine, methyl, ethyl, phenyl, N,N-bis-(β-hydroxy-ethyl)-amino or β-ethoxyethoxy or 3,3'-bis(m-tolylene) uretdione; $p$ and $r = 1$ or 2, $q = 2$ and the sum of $p+q+r$ must be at least 4.

2. A disazo dyestuff as claimed in claim 1, wherein X' and Y' represent —NH—, the two B, X', Y', $p$, $q$ and $r$ are the same, and in which at least one of the residues $R_2$, $R_1$ and $R_3$ represents ethyl or ethyl substituted in β-position by cyano, hydroxyl, acetyloxy carbomethoxy, carboethoxy or carbopropoxy.

3. A disazo dyestuff as claimed in claim 9 of the formula

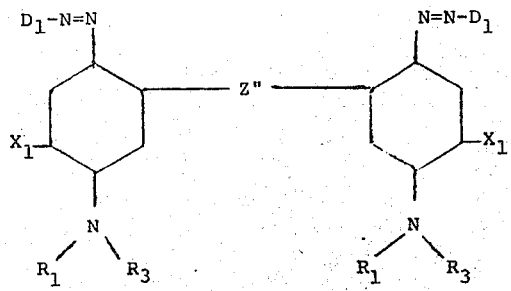

in which $X_1$ represents hydrogen, methyl or methoxy; $R_1$ and $R_3$ each represents hydrogen or lower alkyl and $Z''$ has the formula $$-NH-CO-R'-CO-NH-$$

or $$-NH-CO-NH-R'-NHCONH-.$$

4. A disazo dyestuff as claimed in claim 3, wherein $X_1$ represents hydrogen and $R_1$ and $R_3$ each represent lower alkyl containing not more than 4 carbon atoms or acetyloxy substituted lower alkyl.

5. A disazo dyestuff as claimed in claim 1 of the formula

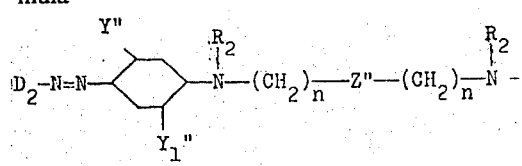

in which $Y''$ and $Y_1''$ each represents hydrogen, chlorine, lower alkyl, lower alkoxy, benzoylamino or lower alkanoylamino.

6. A disazo dyestuff as claimed in claim 1, wherein $D_2$ represents the formula

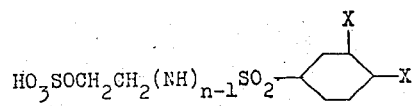

where $n = 1$ or 2, one X is bound to the azo group and the other is —H, —Cl, —$CH_3$ or —$OCH_3$.

7. A disazo dyestuff as claimed in claim 1, wherein the substituent on $D_1$ and $D_2$ is chloroacetylamino, α,β-dibromopropionylamino, acrylamino, α-bromoacrylamino or β-sulphatopropionylamino.

* * * * *